United States Patent
Ahmadi et al.

(10) Patent No.: US 8,799,312 B2
(45) Date of Patent: Aug. 5, 2014

(54) EFFICIENT LABEL ACQUISITION FOR QUERY REWRITING

(75) Inventors: Seyed Ali Ahmadi, Bellevue, WA (US); Alnur Ali, Kirkland, WA (US); Aparna Lakshmiratan, Kirkland, WA (US); Deepak Agarwal, Seattle, WA (US); Sameer Yusufali Merchant, Redmond, WA (US); Michael Revow, Bellevue, WA (US); Ahmad Abdulkader, San Jose, CA (US)

(73) Assignee: Microsoft Corporation, Redmond, WA (US)

(*) Notice: Subject to any disclaimer, the term of this patent is extended or adjusted under 35 U.S.C. 154(b) by 814 days.

(21) Appl. No.: 12/977,277

(22) Filed: Dec. 23, 2010

(65) Prior Publication Data

US 2012/0166473 A1 Jun. 28, 2012

(51) Int. Cl.
*G06F 17/30* (2006.01)

(52) U.S. Cl.
USPC .......................................................... 707/769

(58) Field of Classification Search
USPC ................. 707/706–710, 713–723, 726–732, 707/736–746, 759, 763–775, 779–781
See application file for complete search history.

(56) References Cited

U.S. PATENT DOCUMENTS

| | | | |
|---|---|---|---|
| 7,536,382 B2 | 5/2009 | Zhou et al. | |
| 8,055,669 B1* | 11/2011 | Singhal et al. | 707/765 |
| 2006/0143159 A1* | 6/2006 | Chowdhury et al. | 707/3 |
| 2006/0167896 A1 | 7/2006 | Kapur et al. | |
| 2007/0136251 A1* | 6/2007 | Colledge et al. | 707/3 |
| 2007/0214128 A1 | 9/2007 | Smith | |
| 2008/0040323 A1 | 2/2008 | Joshi | |
| 2009/0198644 A1 | 8/2009 | Buchner et al. | |
| 2009/0327260 A1 | 12/2009 | Li et al. | |
| 2010/0010895 A1 | 1/2010 | Gabrilovich et al. | |

OTHER PUBLICATIONS

Generating Query Substitutions—Published Date: May 23-26, 2006 http://citeseerx.ist.psu.edu/viewdoc/download?doi=10.1.1.62.2980&rep=rep1&type=pdf.
More Spotting Google's Related Searches at Bottom of Page—Published Date: Jan. 15, 2007 http://searchengineland.com/more-spotting-googles-related-searches-at-bottom-of-page-10261.
Web Mining for Unsupervised Classification—Published Date: 2009 http://www.aclweb.org/anthology/O/O09/O09-1005.pdf.

* cited by examiner

*Primary Examiner* — Hosain Alam
*Assistant Examiner* — Reza Hosseini
(74) *Attorney, Agent, or Firm* — Dave Ream; Doug Barker; Micky Minhas

(57) ABSTRACT

Systems, methods, and computer storage media having computer-executable instructions embodied thereon for rewriting queries and labeling word pairs. Queries are received and alternate words are identified for word pairs (i.e., query words and alternate words). Word pair links are presented to users and indicators are received based on actions taken by the users. Labels are assigned to the word pairs based on the indicators and communicated to a classifier.

4 Claims, 5 Drawing Sheets

US 8,799,312 B2

EFFICIENT LABEL ACQUISITION FOR QUERY REWRITING

BACKGROUND

In the field of machine learning, acquiring training data for a classifier presents a challenge. A core aspect of machine learning is classification, or the task of writing a computer program to differentiate between two things. Just as humans learn to do this via example, machine learning algorithms are presented with examples called training data or labels. Classifiers are used to rewrite queries for search engines. If a user types a word into a query box, a similar word is used to match relevant documents containing the original word or the similar word. However, collecting training requires significant time and money. Often, this is accomplished by paying human judges to spend considerable time inspecting examples. Accordingly, a more efficient manner of building a classifier and determining acceptable query rewrites is needed.

SUMMARY

Embodiments of the present invention relate to systems, methods, and computer-readable media for, among other things, training classifiers and query rewriting. Queries are received comprising query words. Alternate words are identified to form word pairs. Classifiers determine whether the word pairs are labeled or labeled to meet a threshold confidence. Word pair links are displayed with selectable links for the query results of each word in the word pair. Indicators are received and labels are assigned to the word pair based on the indicators.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Figure 1:
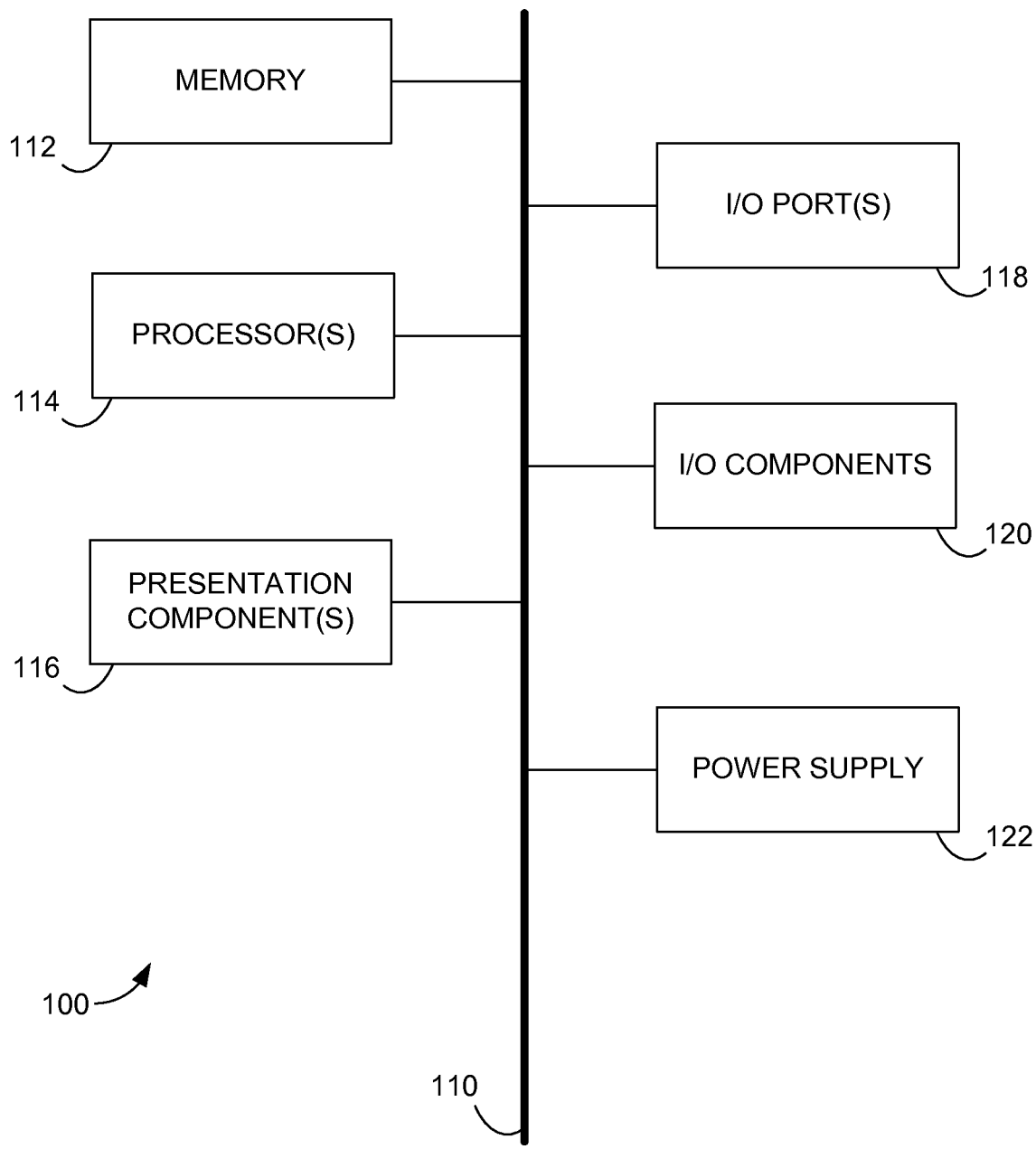
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the invention described herein include computer-readable media having computer-executable instructions and causing a computing device to perform a method of rewriting queries and labeling word pairs. Initial queries are received comprising query words. Alternate words are identified for word pairs. Word pairs comprise query words and alternate words. Preliminary labels are determined to not exist or not meet a threshold confidence. Word pair links are presented comprising selectable links operable to display results for initial queries and alternate queries. Indicators are received comprising data extracted from click analytics, behavioral targeting, geolocation, page tagging, logfile analysis, or a combination thereof. Labels are assigned to the word pairs and communicated to the classifier.

In a second illustrative embodiment, computer-executable instructions cause a computing device to perform a method of rewriting queries. Initial queries are received comprising query words. First alternate queries are identified comprising first alternate words. Initial term frequencies are determined by counting the number of instances of the query words in snippets of results for the initial queries. Similarly, alternate term frequencies are determined by counting the number of instances of the alternate words in snippets of results for the initial queries. Initial term frequencies are compared to the alternate term frequencies and query results are displayed.

In a third illustrative embodiment, computer-executable instructions cause a computing device to perform a method of labeling word pairs. Preliminary labels are analyzed for word pairs. Word pairs comprise a query words and alternate words. Search queries are received for the query words. Word pairs are presented in word pair links and indicators are received for the word pairs. Labels are assigned to word pairs based on the indicators.

Various aspects of embodiments of the invention may be described in the general context of computer program products that include computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Embodiments of the invention may be practiced in a variety of system configurations, including dedicated servers, general-purpose computers, laptops, more specialty computing devices, and the like. The invention may also be practiced in distributed computing environments where tasks are performed by remote-processing devices that are linked through a communications network.

Computer-readable media include both volatile and nonvolatile media, removable and nonremovable media, and contemplate media readable by a database, a processor, and various other networked computing devices. By way of example, and not limitation, computer-readable media include media implemented in any method or technology for storing information. Examples of stored information include computer-executable instructions, data structures, program modules, and other data representations. Media examples include, but are not limited to RAM, ROM, EEPROM, flash memory and other memory technology, CD-ROM, digital versatile discs (DVD), holographic media and other optical disc storage, magnetic cassettes, magnetic tape, magnetic disk storage, and other magnetic storage devices. These technologies can store data momentarily, temporarily, or permanently.

An exemplary operating environment in which various aspects of the present invention may be implemented is described below in order to provide a general context for various aspects of the present invention. Referring initially to FIG. 1, an exemplary operating environment for implementing embodiments of the present invention is shown and designated generally as computing device 100. The computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The computing device 100 includes a bus 110 that directly or indirectly couples the following devices: a memory 112, one or more processors 114, one or more presentation components 116, input/output (I/O) ports 118, input/output components 120, and an illustrative power supply 122. The bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. The inventors recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

The memory 112 includes computer-executable instructions (not shown) stored in volatile and/or nonvolatile memory. The memory may be removable, nonremovable, or a combination thereof. Exemplary hardware devices include solid-state memory, hard drives, optical-disc drives, etc. The computing device 100 includes one or more processors 114 coupled with a system bus 110 that read data from various entities such as the memory 112 or I/O components 120. In an embodiment, the one or more processors 114 execute the computer-executable instructions to perform various tasks and methods defined by the computer-executable instructions. The presentation component(s) 116 are coupled to the system bus 110 and present data indications to a user or other device. Exemplary presentation components 116 include a display device, speaker, printing component, and the like.

The I/O ports 118 allow computing device 100 to be logically coupled to other devices including the I/O components 120, some of which may be built in. Illustrative components include a microphone, joystick, game pad, satellite dish, scanner, printer, wireless device, keyboard, pen, voice input device, touch-input device, touch-screen device, interactive display device, or a mouse. The I/O components 120 can also include communication connections that can facilitate communicatively connecting the computing device 100 to remote devices such as, for example, other computing devices, servers, routers, and the like.

Figure 2:
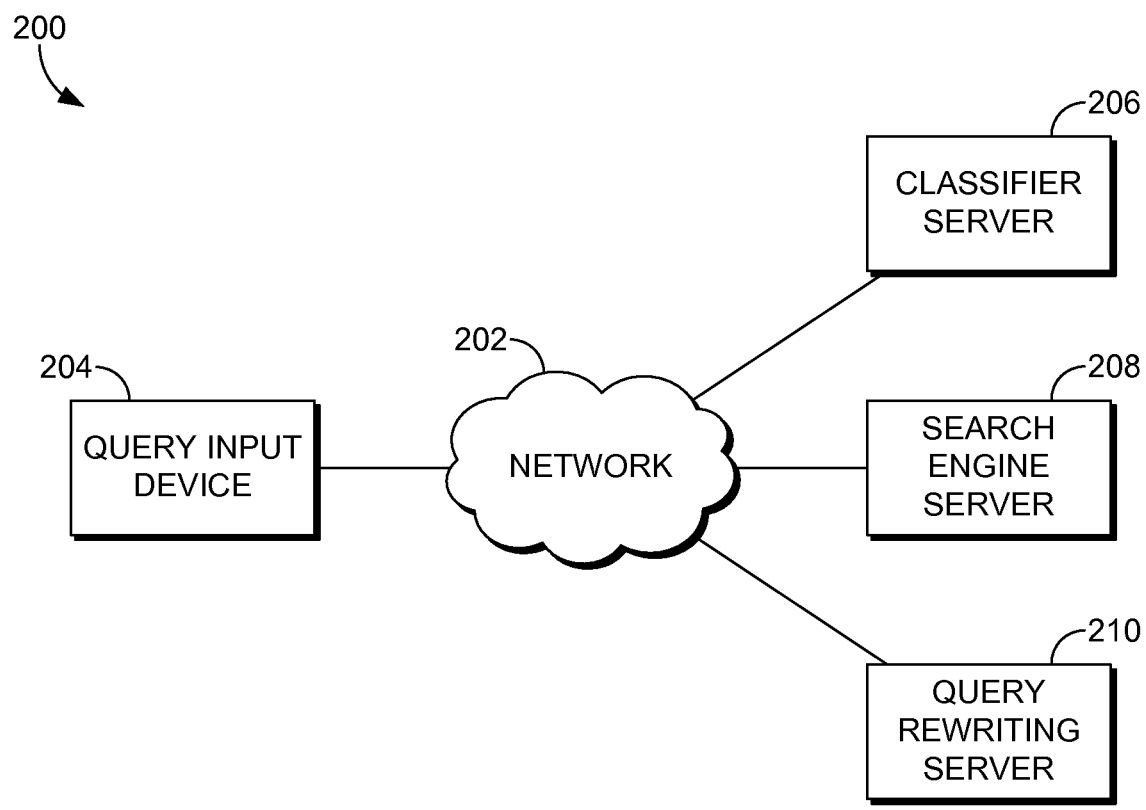
FIG. 2 schematically shows a network environment suitable for performing embodiments of the invention.

With reference to FIG. 2, a block diagram is illustrated that shows an exemplary computing system architecture 200 configured for use in implementing embodiments of the present invention. It will be understood and appreciated by those of ordinary skill in the art that the computing system architecture 200 shown in FIG. 2 is merely an example of one suitable computing system and is not intended to suggest any limitation as to the scope of use or functionality of the present invention. Neither should the computing system architecture 200 be interpreted as having any dependency or requirement related to any single module/component or combination of modules/components illustrated therein.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components/modules, and in any suitable combination and location. Various functions described herein as being performed by one or more entities may be carried out by hardware, firmware, and/or software. For instance, various functions may be carried out by a processor executing instructions stored in memory.

The environment 200 includes a network 202, a query input device 204, a search engine server 206, a classifier server 208, and a query rewriting server 210. The network 202 includes any computer network such as, for example and not limitation, the Internet, an intranet, private and public local networks, and wireless data or telephone networks. The query input device 204 is any computing device, such as the computing device 100, from which a search query can be initiated. For example, the query input device 204 might be a personal computer, a laptop, a server computer, a wireless phone or device, a personal digital assistant (PDA), or a digital camera, among others. In an embodiment, a plurality of query input devices 204, such as thousands or millions of query input devices 204, is connected to the network 202. The search engine server 206, the classifier server 208, and the query rewriting server 210 are integrated, in one embodiment, in a single computing device. In another embodiment, the search engine server 206, the classifier server 208, and the query rewriting server 210 may otherwise be in communication such that each server does not have to traverse the network 202 to communicate with one another.

The search engine server 206 includes any computing device, such as the computing device 100, and provides at least a portion of the functionalities for providing a search engine. In an embodiment a group of search engine servers 206 share or distribute the functionalities for providing search engine operations to a user population.

A classifier server 208 is also provided in the environment 200. The classifier server 208 includes any computing device, such as computing device 100, and is configured to analyze the word pairs and determine labels. The classifier server 208 receives query words submitted by a user to the search engine server 206. The classifier server 208 also receives alternate words from the query rewriting server 210 and determines whether the word pair (e.g., the query word and the alternate word) are labeled, in one embodiment, or confidently labeled, in another embodiment.

In embodiments, after an alternate term is determined by the query rewriting server 210, the search engine server 206, transparent to the user, determines term frequencies associated with the initial query word and the alternate word. An initial term frequency is determined by analyzing snippets associated with search results of the query word and counting the instances of the query word in the snippets of results for the initial query. Similarly, an alternate term frequency is determined by analyzing snippets associated with search results of the query word and counting the instances of the alternate word in the snippets of results for the initial query. As can be appreciated, search results refer to a result that is presented as relevant to a user search query. Typically, a search result includes a website link and a snippet that summarizes content of the website. If the alternate term frequency does not meet an optimal threshold (e.g., is lower than the initial term frequency by a predetermined margin), then it is likely that the alternate word is not a synonym for the query word. This is also likely to indicate that the alternate word is not an acceptable rewrite. If the alternate term frequency meets optimal threshold, then a word pair link comprising the alternate word and the query word is provided to the user. In one embodiment, the optimal threshold is configurable. In one embodiment, the optimal threshold is set by an administrator associated with the search engine. In another embodiment, the optimal threshold is set by a user.

In various embodiments, an alternate word is not included in the word pair link. In one embodiment, an alternate word is not included in the word pair link if it does not provide useful information (e.g., no search results exist for the alternate query). In another embodiment, the alternate word is not included in the word pair link if it does not produce significant results (e.g., the difference between the alternate word is minor enough that the user would not distinguish between the results of the alternate word and the query word). In another embodiment, the alternate word is not included in the word pair link if the alternate word does not appear in the snippet, title, anchor, or Uniform Resource Locator (URL) of any of the top ten results but the query word does. In another embodiment, the alternate word is not included in the word pair link if the alternate word is not included in the snippet, title, anchor, or URL of the majority of the top ten results, including the top 3 results but the query word does. In another embodiment, the alternate word is not included in the word pair link if the alternate word co-occurs with the query word for all of the top ten results. In another embodiment, the alternate word is not included in the word pair link if the alternate word co-occurs with the query word in the majority of the top ten results, including the top 3 results.

In one embodiment, another alternate word is selected if it is determined the previous alternate word should not be included in the word pair link. In another embodiment, the results for the query word are displayed if it is determined the previous alternate word should not be included in the word pair link. In one embodiment, the classifier server 208 automatically labels the word pair if the alternate word is not included in the word pair link, as described in any of the embodiments above.

In instances where the classifier server 208 cannot label the word pair, the word pair needs to be labeled by a human classifier. The search engine server 206 presents the word pair to the user submitting the query in a word pair link comprising a selectable link for the query word and a selectable link for the alternate word. The word pair is presented in a word pair link and provides the user with an alternate word that may or may not be what the user intended. In various embodiments, the alternate word may be a corrected spelling, a full name rather than an abbreviation, or simply an alternative that is similar to or otherwise closely associated with the query word.

The classifier server 208 receives indicators based on actions taken by the user. In one embodiment, the indicators track actions of users after being presented with search results. In various embodiments, the actions tracked may be links or search results the user selected, advertisements the user selected, additional search queries the user inputted, the link selected by the user from a word pair link, additional web sites the user navigated to, or various other preferences or actions that may be tracked or tied to the user's identification or identification signals. In one embodiment, the indicators track actions of users prior to being presented with a word pair link. In one embodiment, the indicators track actions of users after being presented with a word pair link. In various embodiments, the indicators represent click through rates.

The classifier server analyzes the indicators and determines a label for the word pair. The label can then be used by the classifier server 208 in future search requests or as training data. For example, if the indicators indicate that the user found the alternate query helpful, the active learning server 208 determines that the alternate word is a synonym for the query word, and labels the word pair appropriately. The next time a user searches for the query word, the query rewriting server 210 may provide a word pair with the same alternate word. When the word pair is communicated to the classifier server 208, the classifier server 208 will have knowledge of the label and does not have to receive assistance from a human classifier (in the manner described above).

In another illustrative example, a user submits a query for "bio". The search engine server 206 asks for an alternate word from the query rewriting server 210. The query rewriting server 210 responds with a word pair comprising the query word, "bio", and an alternate word, "biography". The query rewriting server 210 asks the classifier server 208 if the word pair is labeled. The classifier server 208 will determine that the query word and the alternate word are synonyms (indicating the alternate word is an acceptable rewrite) or not synonyms (indicating that the alternate word is not an acceptable rewrite), based on the label. The classifier server 208 may also determine that, although the word pair has a label, a confidence factor for the label does not meet a threshold. Similar to the instance where the word pair does not have a label, the search engine server 206 presents a word pair link. The classifier server 208 receives indicators and determines a label for the word pair.

Figure 3:
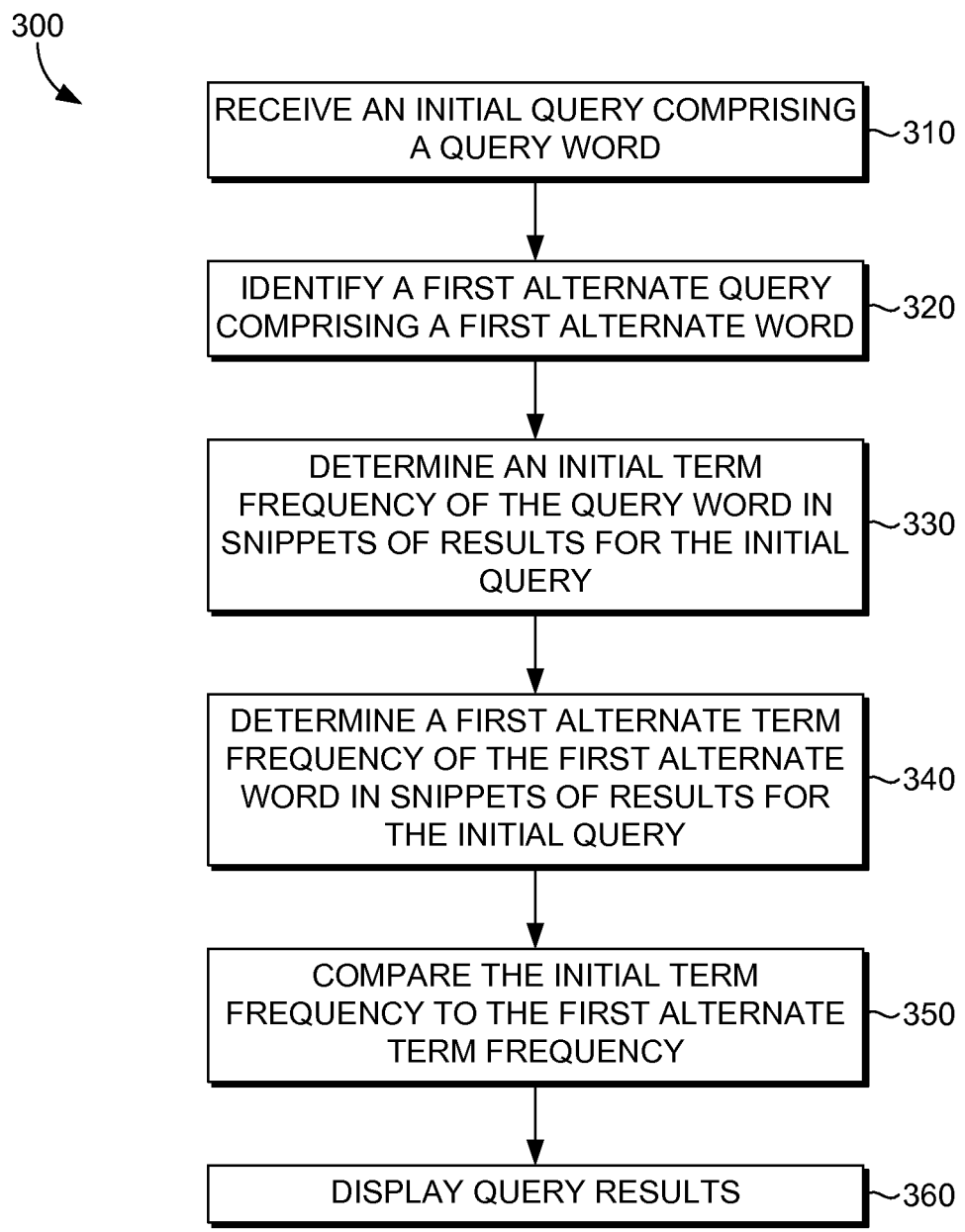
FIG. 3 is a flow diagram showing a method for query rewriting, in accordance with an embodiment of the present invention.

Referring now to FIG. 3, a flow diagram illustrates a method for identifying alternate words for word pairs, in accordance with an embodiment of the present invention. A search engine receives an initial query comprising a query word, at step 310. The query word is entered as a search term by a user. At step 320, a first alternate query is identified comprising a first alternate word. The first alternate query is not initially displayed to the user. An initial term frequency of the query word is determined, at step 330, by identifying instances of the query word in snippets of results for the initial query. Similarly, a first alternate term frequency of the first alternate word is determined, at step 340, by identifying instances of the first alternate word in snippets of results for the initial query. At step 350, the initial term frequency is compared to the first alternate term frequency. Query results are displayed at step 360.

In one embodiment, the first alternate term frequency is greater than the initial term frequency (i.e., the first alternate word appears more often in snippets of results for the first alternate query than the query word) indicating that the first alternate word is an acceptable rewrite for the query word. In one embodiment, the first alternate term frequency meets a configurable threshold, also indicating that the first alternate word is an acceptable rewrite for the query word. In each of these instances, where the first alternate word is an acceptable rewrite for the query word, a word pair link comprising the first alternate word and the query word is displayed to a user.

In one embodiment, the word pair link prompts the user to select the query word or a first alternate word. In another embodiment, the word pair link prompts the user to select the query word or a second alternate word. The second alternate word is identified, for example, in instances where it is determined that the first alternate word is not an acceptable rewrite. In another embodiment, the word pair link prompts the user to select the query word or an alternate word. As described above, indicators (including, in one embodiment, which word in the word pair link a user selects) will assist the classifier server 208 in labeling the word pair.

In another embodiment, the first alternate term frequency is less than or equal to the initial term frequency (or does not meet a configurable threshold). This indicates the first alternate word is not an acceptable rewrite for the query word. Query results are displayed for the query word to the user.

In another embodiment, the first alternate term frequency is less than or equal to the initial term frequency (or does not meet a configurable threshold). This indicates the first alternate word is not an acceptable rewrite for the query word. A second alternate query comprising a second alternate word is identified. In one embodiment, a second alternate term frequency satisfies a configurable threshold and a word pair link comprising the query word and a second alternate word is displayed. In one embodiment, the user is prompted to select the query word or the second alternate word.

In one embodiment, an alternate word comprises more than one word. Blame is assigned to variations in term frequency. In one embodiment, blame is assigned equally to each element of the alternate word. In another embodiment, a partial blame is assigned to each element of the alternate word according to an amount of change in term frequency each element causes. For example, assume an alternate word comprises two elements. By comparing the term frequency for each of the two elements in snippets of the search results against the initial term frequency, it can easily be determined which element is responsible for altering the results. Accordingly, a partial blame can be assigned to each element based on comparing the term frequencies. In one embodiment, blame is assigned based on indicators. In one embodiment, partial blame is assigned based on indicators.

Figure 4:
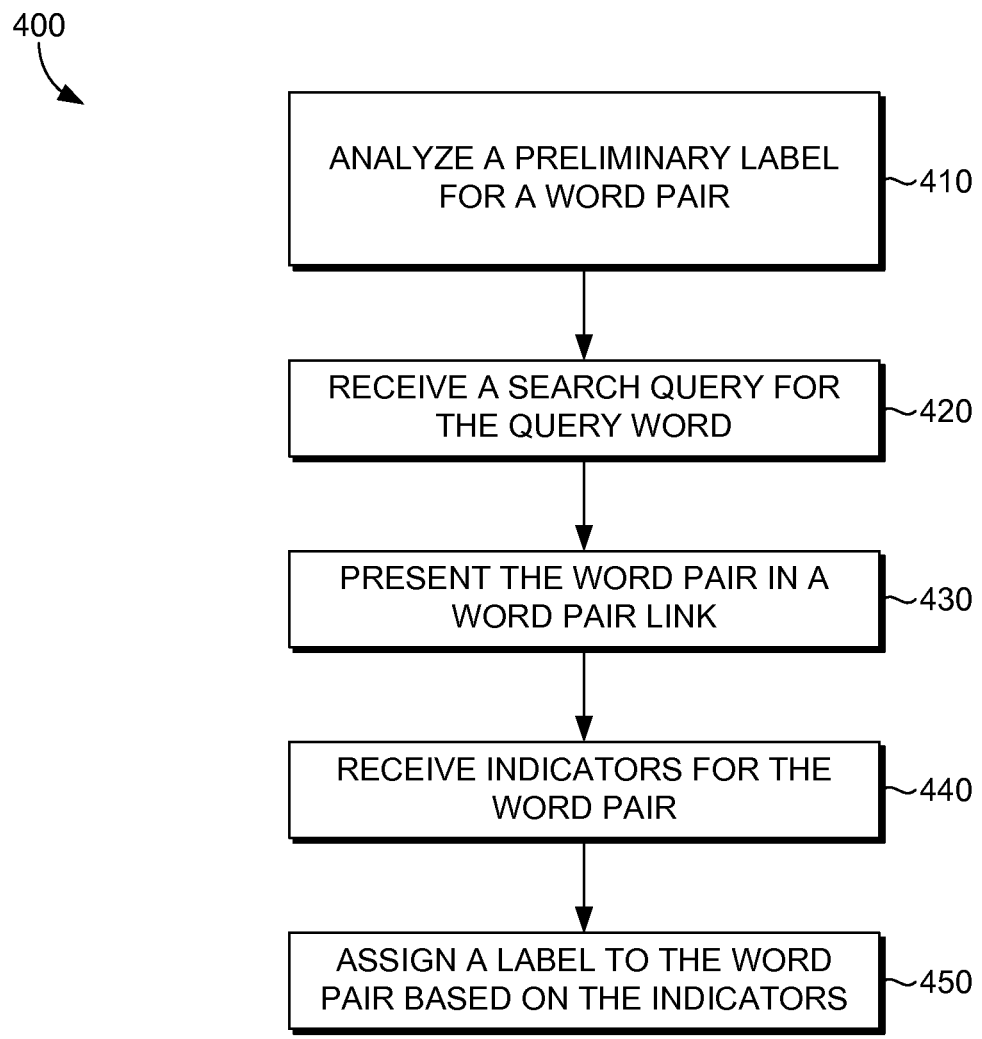
FIG. 4 is a flow diagram showing a method for label acquisition, in accordance with an embodiment of the present invention.

Referring now to FIG. 4, a flow diagram illustrates a method for label acquisition, in accordance with an embodiment of the present invention. At step 410, a preliminary label for a word pair is analyzed. The word pair comprises a query word and an alternate word. It is determined whether the preliminary label satisfies a threshold confidence. In one embodiment, the threshold is configurable. In another embodiment, the threshold is configurable by an administrator of a search engine. In yet another embodiment, the threshold is configurable by a user of a search engine. In one embodiment, whether the preliminary label satisfies a threshold confidence is determined by analyzing indicators. In one embodiment, it is determined that the preliminary label for a word pair does not satisfy a threshold. The word pair is presented in a word pair link, at step 430. Indicators are received for the word pair, at step 430. A label is assigned to the word pair, at step 440, based on the indicators. In one embodiment, the label is communicated to the classifier.

In one embodiment, indicators comprise data extracted from click analytics. In another embodiment, indicators comprise data extracted from behavioral targeting. In another embodiment, indicators comprise data extracted from geolocation. In another embodiment, indicators comprise data extracted from page tagging. In another embodiment, indicators comprise data from logfile analysis. In another embodiment, indicators comprise data extracted from click analytics, behavioral targeting, geolocation, page tagging, logfile analysis, or a combination thereof.

In one embodiment, assigning a label to the word pair based on the indicators comprises analyzing the indicators for the word pair. The alternate word and the query word are determined to be synonyms (i.e., an acceptable rewrite). A label is assigned to the word pair indicating the alternate word and the query word are synonyms.

In another embodiment, assigning a label to the word pair based on the indicators comprises analyzing the indicators for the word pair. The alternate word and the query word are determined not to be synonyms (i.e., not an acceptable rewrite). A label is assigned to the word pair indicating the alternate word and the query word are not synonyms.

In another embodiment, a second word pair is identified. The second word pair comprises the query word and a second alternate word. The second word pair is presented in a second word pair link. Indicators are received for the second word pair and a label is assigned to the second word pair based on the indicators.

Figure 5:
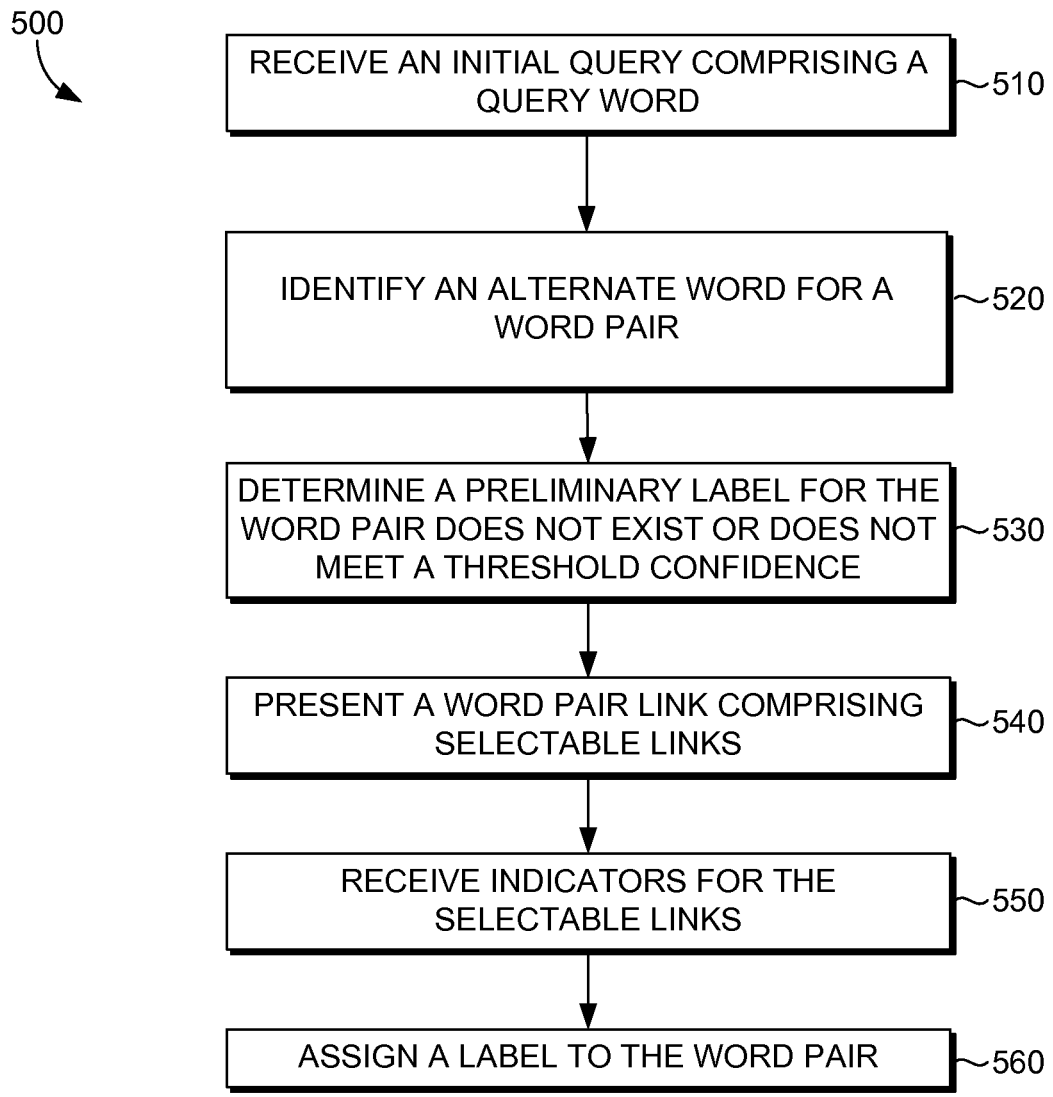
FIG. 5 is a flow diagram showing a method for query rewriting and label acquisition, in accordance with an embodiment of the present invention.

Turning now to FIG. 5, a flow diagram illustrates a method for query rewriting and label acquisition, in accordance with an embodiment of the present invention. At step 510, an initial query is received comprising a query word. An alternate word for a word pair is identified, at step 520. The word pair comprises the query word and the alternate word. A preliminary label is determined, at step 530, to not exist or not meet a threshold confidence. At step 540, the word pair link comprising selectable links is presented. Indicators are received for the selectable links, at step 550. As described above, the indicators comprise data extracted from click analytics, behavioral targeting, geolocation, page tagging, logfile analysis, or a combination thereof. At step 560, a label is assigned to the word pair. In one embodiment, the label is communicated to the classifier.

In one embodiment, a term frequency, as described above, of the alternate word in snippets of results for the initial query is determined. An alternate term frequency is determined for the alternate word in snippets of results for the initial. As described above, the alternate term frequency is then compared to the initial term frequency to determine if the alternate word should appear in the word pair link.

It will be understood by those of ordinary skill in the art that the order of steps shown in the method 300, 400, and 500 of FIGS. 3, 4, and 5 respectively are not meant to limit the scope of the present invention in any way and, in fact, the steps may occur in a variety of different sequences within embodiments hereof. Any and all such variations, and any combination thereof, are contemplated to be within the scope of embodiments of the present invention.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A method of determining which alternate word to include in a word pair link, the method comprising:

receiving, at a computing device, an initial query comprising a query word;

identifying a first alternate query comprising a first alternate word, wherein the first alternate word comprises more than one element;

determining an initial term frequency of the query word in snippets of results for the initial query;

determining a first alternate term frequency for each element of the first alternate word in snippets of results for the initial query;

comparing the initial term frequency to the first alternate term frequency for each element of the first alternate word;

assigning a blame to each element of the first alternate word based on comparing term frequencies, wherein the blame indicates an amount of change in term frequency caused by each element of the first alternate word;

determining the first alternate term frequency satisfies a configurable threshold;

displaying a word pair link comprising the query word and the first alternate word, wherein the word pair link prompts a user to select the query word or the first alternate word;

receiving indicators for the word pair; and assigning a label to the word pair based on the indicators indicating whether the query word and the first alternate word are synonyms.

2. The method of claim 1 wherein the blame is assigned equally to each element of the first alternate word.

3. The method of claim 1 wherein partial blame is assigned to each element of the first alternate word according to an amount of change in term frequency each element of the first alternate word causes.

4. A method of selecting word pairs and labels for word pair links, the method comprising:

receiving, at a computing device, an initial query comprising a query word;

identify an alternate word for a word pair, wherein the word pair comprises the query word and the alternate word;

determining an initial term frequency of the query word in snippets of results for the initial query;

determining an alternate term frequency of the alternate word in snippets of results for the initial query;

comparing the initial term frequency to the alternate term frequency;

assigning a blame to each element of the first alternate word based on comparing term frequencies, wherein blame indicates an amount of change in term frequency caused by each element of the first alternate word;

determining a preliminary label for the word pair meets a threshold confidence;

presenting a word pair link comprising selectable links operable to display the results for the query word and the alternate word respectively;

receiving indicators comprising data extracted from click analytics, behavioral targeting, geolocation, page tagging, logfile analysis, or a combination thereof;

assigning a label to the word pair indicating whether the query word and alternate word are synonyms; and communicating the label to the classifier.

\* \* \* \* \*